United States Patent [19]
Arato

[11] Patent Number: 5,193,931
[45] Date of Patent: Mar. 16, 1993

[54] JOINTING SYSTEM

[75] Inventor: Paul T. Arato, Willowdale, Canada

[73] Assignee: Arato Design Associates, Inc., Canada

[21] Appl. No.: 673,839

[22] Filed: Mar. 22, 1991

[51] Int. Cl.⁵ .............................................. F16B 9/02
[52] U.S. Cl. .................................... 403/231; 403/340; 403/402; 52/286; 405/284
[58] Field of Search ................ 403/231, 339, 382, 340, 403/401, 403; 52/286, 233; 446/125, 106; 405/284, 286, 33

[56] References Cited

U.S. PATENT DOCUMENTS

| | | | |
|---|---|---|---|
| 669,591 | 3/1901 | Penny | 52/286 X |
| 1,398,695 | 11/1921 | Hull | 403/231 X |
| 1,533,099 | 4/1925 | Carroll . | |
| 1,655,701 | 1/1928 | Hyland et al. . | |
| 3,304,674 | 2/1967 | Ward . | |
| 4,147,001 | 3/1979 | Oliver . | |
| 4,154,036 | 5/1979 | Moss et al. . | |
| 4,503,647 | 3/1985 | Post et al. . | |
| 4,510,724 | 3/1985 | Magnuson . | |
| 4,619,089 | 10/1986 | Stein . | |
| 4,787,185 | 11/1988 | Gascho | 405/284 |

FOREIGN PATENT DOCUMENTS

| | | | |
|---|---|---|---|
| 64882 | 7/1949 | Denmark | 52/286 |
| 170517 | 9/1934 | Sweden . | |
| 384720 | 12/1965 | Sweden . | |
| 432086 | 7/1935 | United Kingdom | 403/231 |
| 9004688 | 5/1990 | World Int. Prop. O. | 446/106 |

OTHER PUBLICATIONS

"Workbench", Nov.-Dec. 1978, pp. 92-94, 97-99, 139.
"Joints made & used by builders", by W. J. Christy, 1882.
"Splices and Joints", Collection of various joints, 1835-1890.
"The Carpenters & Joiners Assistant", Newlands, 1860.

Primary Examiner—Randolph A. Reese
Assistant Examiner—Heather Chun
Attorney, Agent, or Firm—Lowe, Price, LeBlanc & Becker

[57] ABSTRACT

An improved system for making notch on notch joints and the like wherein the members to be joined have notches formed across a portion of their width. Each member includes a longitudinal extension beyond the notch and these extensions cooperate to form a joint which has a flush exterior and yet is substantially as strong as a conventional notched joint. One configuration allows the same joint members to be employed to form inline, right-angled and T-shaped joints.

12 Claims, 8 Drawing Sheets

JOINTING SYSTEM

FIELD OF THE INVENTION

The present invention relates to construction systems. Specifically, the present invention relates to an improved system of forming a notch on notch joint to connect panels wherein a joint with a flush corner may be formed.

BACKGROUND OF THE INVENTION

Notch on notch joining systems have been known for many years. Perhaps the best known example of a notch on notch joining system is the corner used in conventional log homes. In these well known structures, each log or panel has notches formed across its upper and lower surfaces at each distal end. A right-angled joint is formed by overlying the complementary notches of two logs, the upper notch of a lower log engaging the lower notch of an upper log. Each notch has the same depth as the others, which is typically about one quarter of the diameter of the log. Thus the joint results in a staggered vertical relationship between the logs.

While these joints function well for log homes, problems do exist with these joints. The ability of the joint formed by the notches to resist splaying or closing of the joint, in other words the rigidity of the joint, is dependent upon the size of the walls of the notch and the material from which the notch is formed. Thus, to form a strong joint between logs, the notch is cut across the entire width of the log to maximize the size of the notch walls. This leads to the necessity that a portion of each log extend beyond the joint to form the distal wall of the notch, thus forming a joint with a castellated exterior. It has previously not been possible to produce a notch on notch joint with a flush exterior.

When the notch is formed in a material which is resilient, such as a plastic or a composite wooden beam, the size of the notch walls which are required to provide the necessary strength may be larger than the available area and thus the builder is faced with a joint which may not have sufficient rigidity.

It is therefore an object of the present invention to provide a novel construction system which obviates or mitigates the above-mentioned disadvantages.

SUMMARY OF THE INVENTION

According to one aspect of the present invention there is provided a joint forming system comprising: a first elongate member having a notch formed across a portion of its width, said portion being less than said width; a second elongate member having a complementary notch formed across a like portion of its width; each said member further including a longitudinal extension beyond said notch and each said extension including an abutment surface complementary to the reaction surface of said other extension and said surfaces abutting when said notches are inter-engaged to form a joint.

BRIEF DESCRIPTION OF THE DRAWINGS

Embodiments of the present invention will now be discussed, by way of example only, with reference to the attached figures wherein.

DESCRIPTION OF THE PREFERRED EMBODIMENTS

To clarify the manner in which the present invention is distinguished from the prior art, such a prior art system is described with reference to FIGS. 1, 2 and 3.

Figure 1:
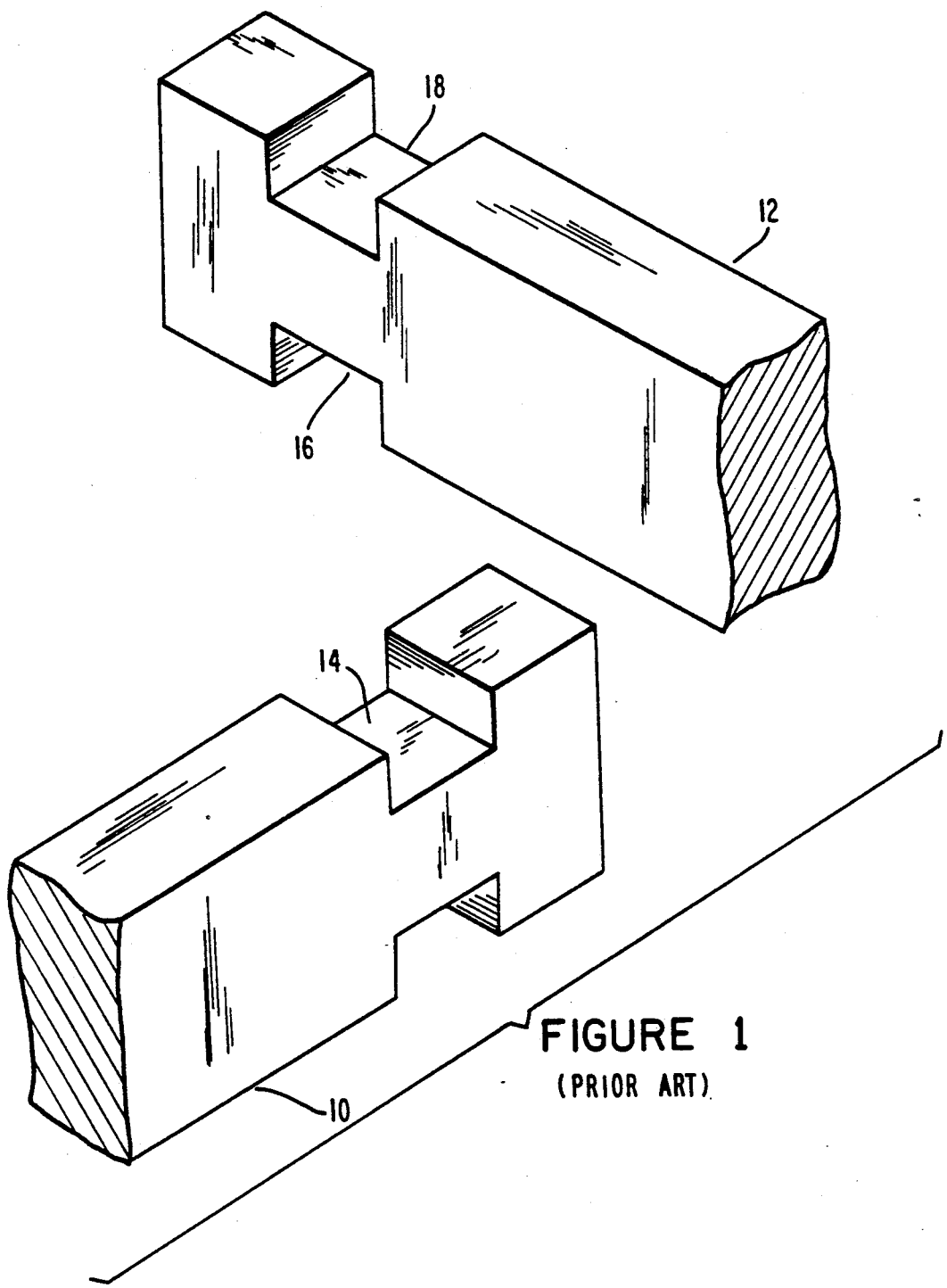
FIG. 1 shows a prior art joint system.
Figure 2:
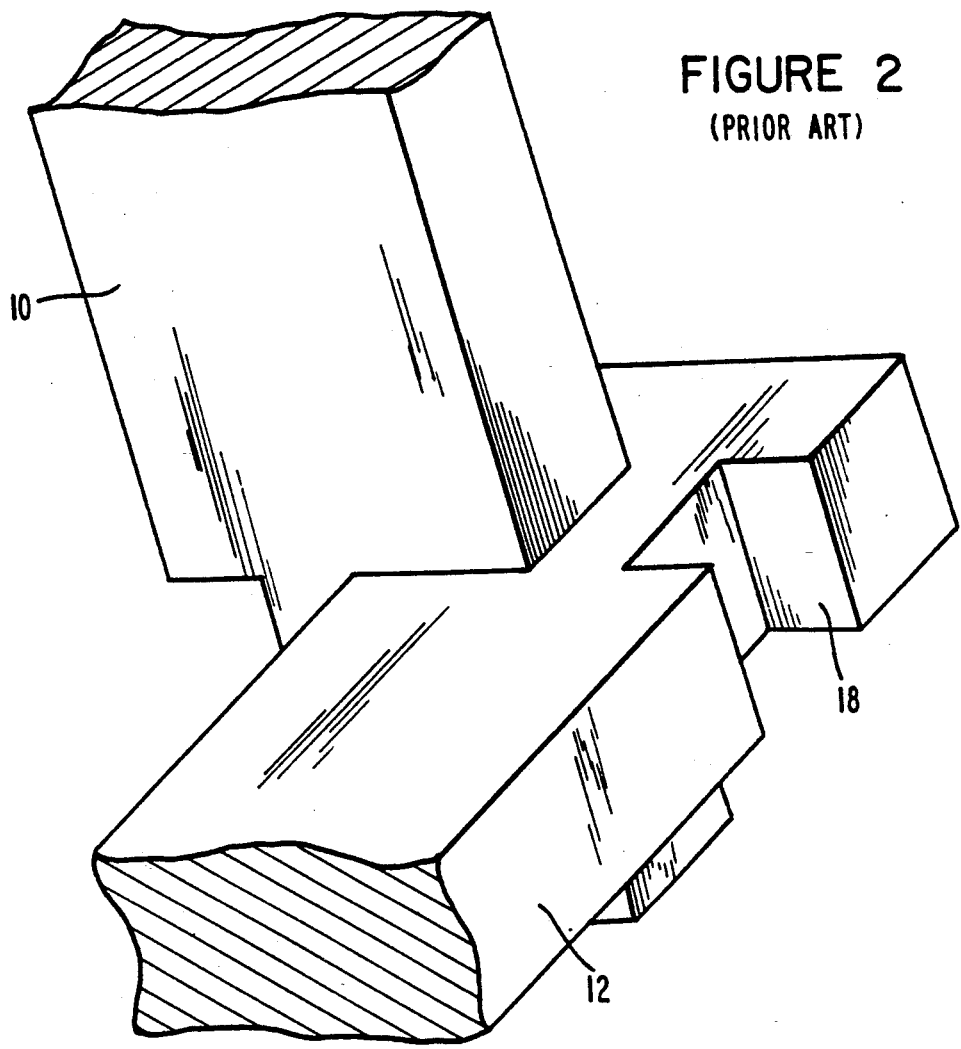
FIG. 2 shows the assembled prior art joint system of FIG. 1.

FIG. 1 shows two panels or beams 10, 12 such as those used in building log homes. The bottom panel has a notch 14 cut across the width of its upper surface to a depth of approximately one quarter of the panel's height. Panel 12 has complementary notches 16,18 formed in its lower and upper surfaces respectively. To form the joining, notches 14 and 16 are overlaid into an interlocking engagement as shown in FIG. 2. As can been seen from FIG. 2, panel 12 is vertically staggered from panel 12 and notch 18 is free to receive another panel which would be placed atop panel 10.

Figure 3:
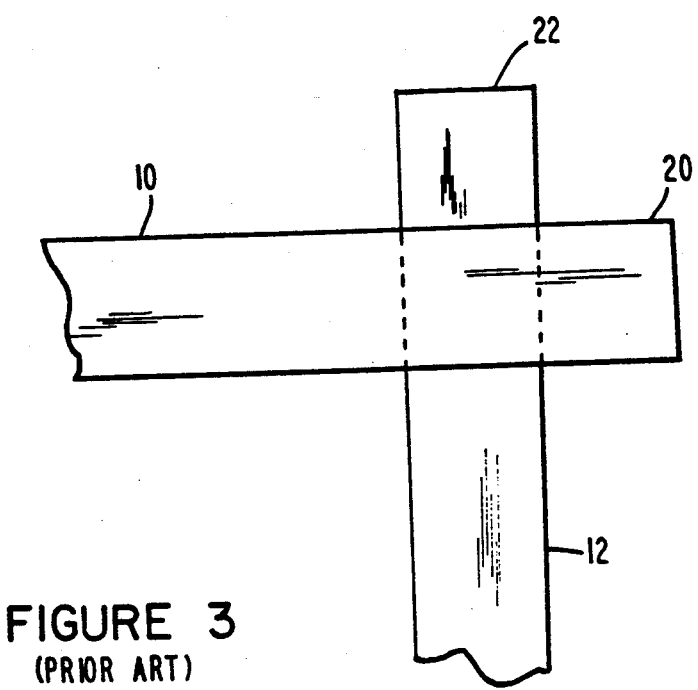
FIG. 3 is a plan view of the assembled joint of FIG. 2.

The joint of FIG. 1 is shown in plan view in FIG. 3. As mentioned previously panel 10 includes a portion 20 which extends beyond the joint as does portion 22 of panel 12. The portions in effect form the distal wall of the notch in their respective panels and give the joint its castellated exterior.

Figure 5:
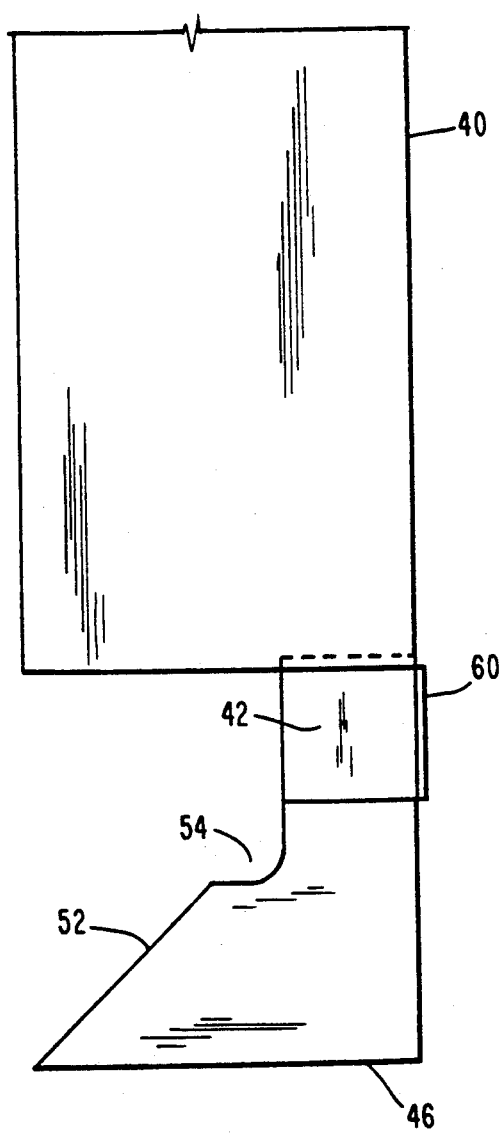
FIG. 5 shows a top view of the element of FIG. 4.
Figure 4:
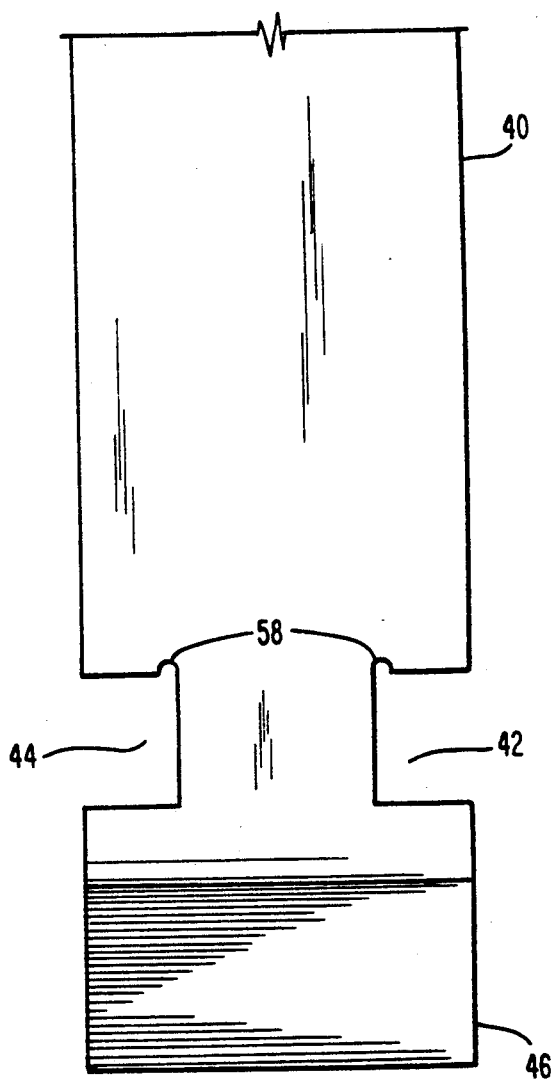
FIG. 4 shows a front view of an element of a joint system.

FIGS. 4 and 5 show a panel constructed in accordance with the present invention. The panel 40 includes upper and lower notches, 42 and 44 respectively, and a tail 46.

Figure 6:
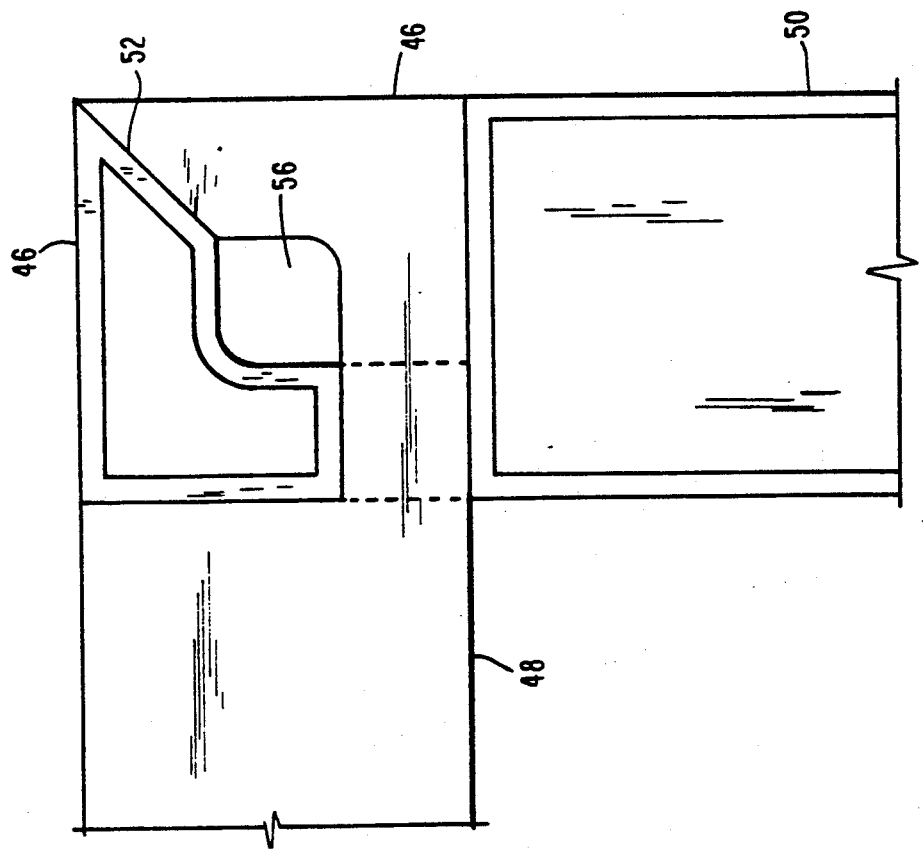
FIG. 6 shows a joint assembly formed from two of the elements shown in FIG. 4.

FIG. 6 shows two of the panels of FIGS. 4 and 5 which have been assembled to form a joint. The outline of one panel 50 has been indicated in double line for clarity. The upper notch 42 of panel 50 is interlocked (as shown in ghosted lines in the figure) with the lower notch 44 of panel 48 in the conventional manner to form the joint. The tails 46 of each panel 48,50 are also brought into interlocking engagement to form an additional abutment surface 52. The shape of the tails 46 also provides a flush exterior surface for the joint.

The abutting surfaces 52 also help inhibit splaying or closing of the joint in addition to the rigidity provided by the notch walls. A void 54 is also provided in each abutting surface 52 to from an aperture 56 through the joint. The aperture 56 may be used for a variety of purposes such as accommodating a support column for a roof or to provide a raceway for electrical cables, among others.

When the panels 40 are constructed of a resilient material, a detent 58 and complementary boss 60 can be used to provide a means for retaining the panels in their interlocked positions. In use, when notch 42 is overlaid notch 44 and the two panels are urged together, the boss 60 on each panel is forced into the detent 58 on each other panel.

As the top and bottom of the structure, a pair of half-height beams may be used to complete the structure.

Figure 7:
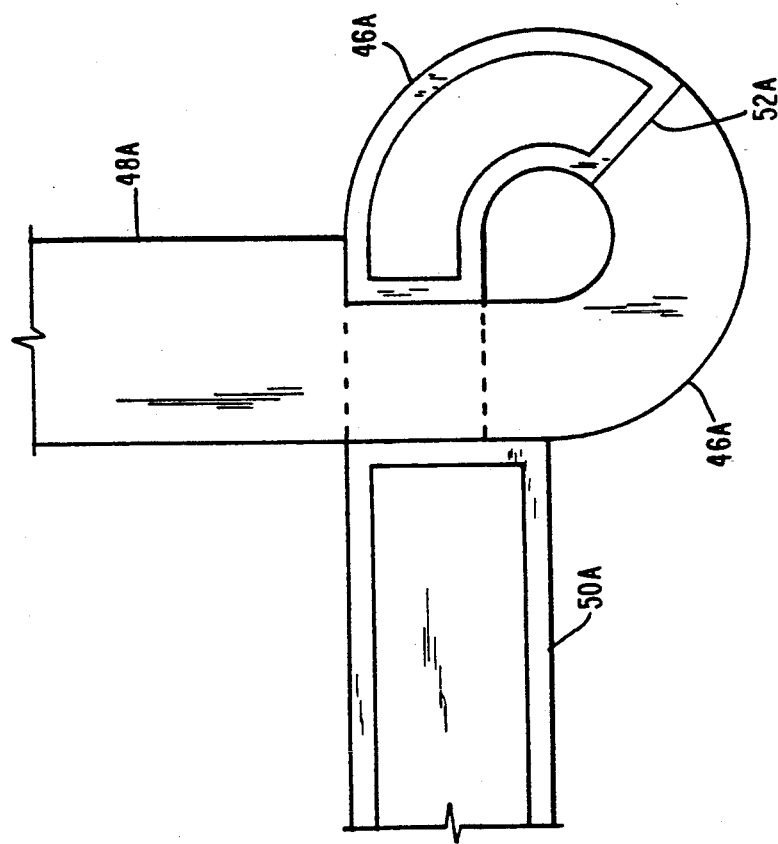
FIG. 7 shows a top vie of another joint assembly.

FIG. 7 shows another embodiment of the present invention. The joint of FIG. 7 is formed by a pair of panels 48A,50A which are a variant of the panel shown in FIGS. 4 and 5. As before, the outline of panel 50A has been indicated in double line for clarity. In this joint, the tails 46A are enlarged with respect to the width of the panels 48A,50A and have an arcuate cross-section.

When the joint is assembled the tails form a circular exterior for the joint and the abutting surfaces 52A are larger in relationship to the width of the panels than is the case with the joint of FIG. 6. Additionally, the abutting surfaces 52A are farther from the notches and thus provide a mechanical advantage to the joint in resisting closing.

As will be understood by those of skill in the art, when the panels are assembled to form a closed frame, the resistance to closing provided by one joint will also provide the opposite joint with a resistance to splaying. It will also be understood by those of skill in the art that many other shapes and configurations are possible for the tails 46 to provide different visual appearances of the external surface of the joint, as well as providing different joint rigidity characteristics as required.

Figures 8, 9:
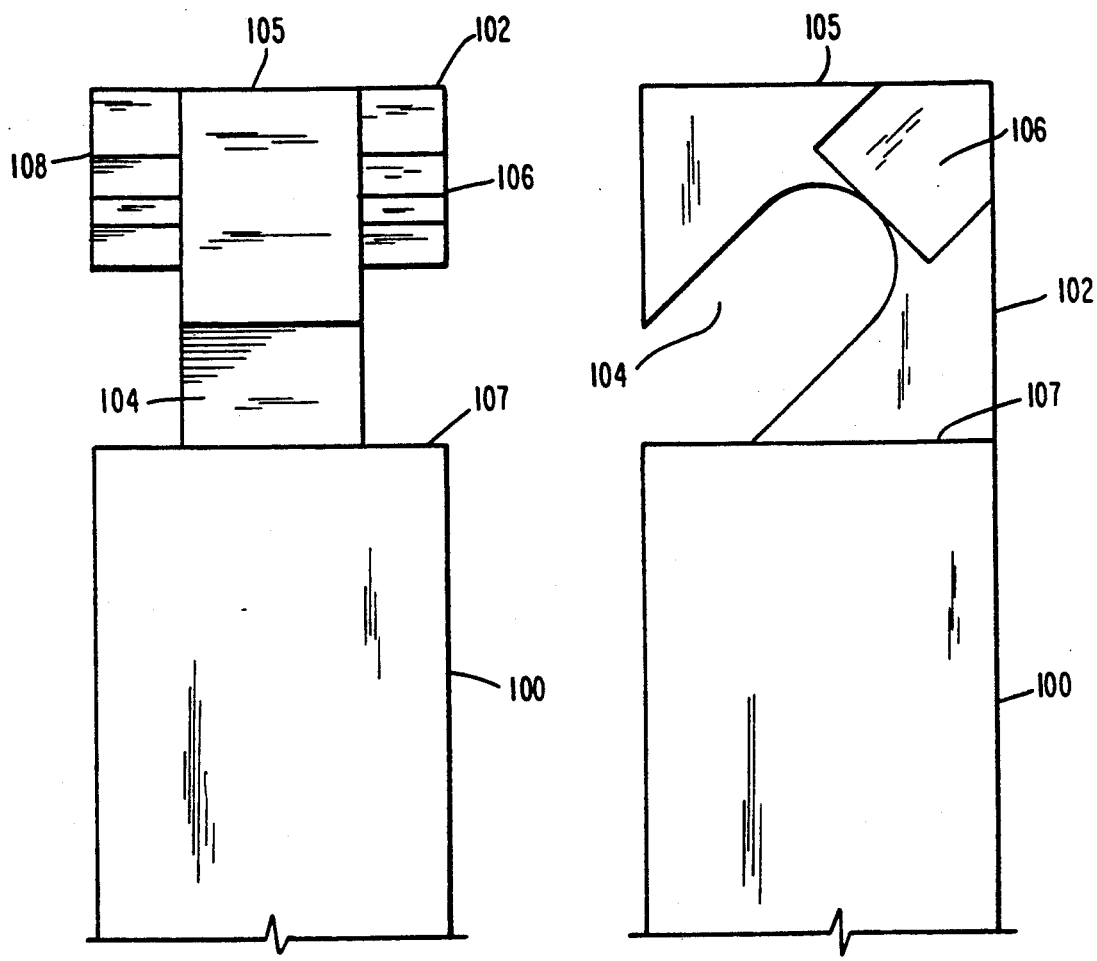
FIG. 8 shows a top view of an other joint element.
FIG. 9 shows a front view of the joint element of FIG. 8.

Another embodiment of the present invention is shown in FIGS. 8 to 11. FIGS. 8 and 9 show a panel 100 with a joint member 102. The joint member 102 includes a through aperture 104 and upper and lower pegs, 106 and 108 respectively, which are sized to engage through aperture 104. The height of each peg 106,108 is one quarter of the hegiht of the beam.

Figure 10:
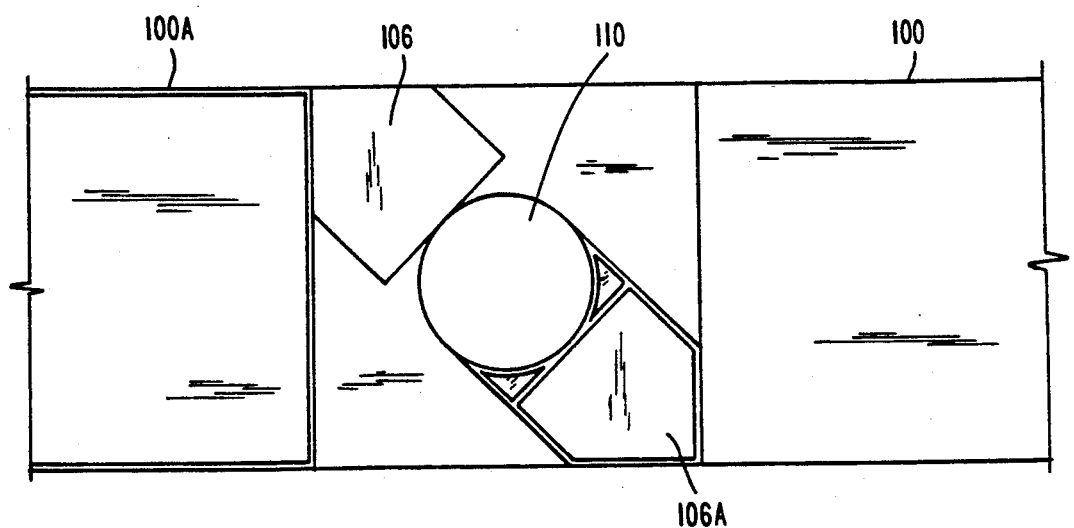
FIG. 10 shows a top view of an inline joint formed from two of the elements of FIG. 8.

FIG. 10 shows an inline joint formed by two of the panels 100,100A. The outline of panel 100A has been indicated in double line for clarity. The joint is formed when the lower peg 108 engages an aperture of panel 100 and upper peg 106A engages aperture of panel 100A. The panels of the inline joint are vertically staggered and form flush exterior joints. When assembled, the joint provides a circular aperture 110 which may be used for any of the purposes listed above for aperture 56.

As will be apparent to those of skill in the art, the gap between peg 106 and surface 107 constitutes one notch while the gap between peg 106 and the panel end 105 constitutes another. Thus a pair of notch joints result when two panels are joined together. The abutment of the pegs in the apertures and the panel ends 105 with abutment surfaces 107 provide increased contact area between the joint members, in comparison to conventional notch on notch joints, and thus results in a joint of improved rigidity.

Figure 11:
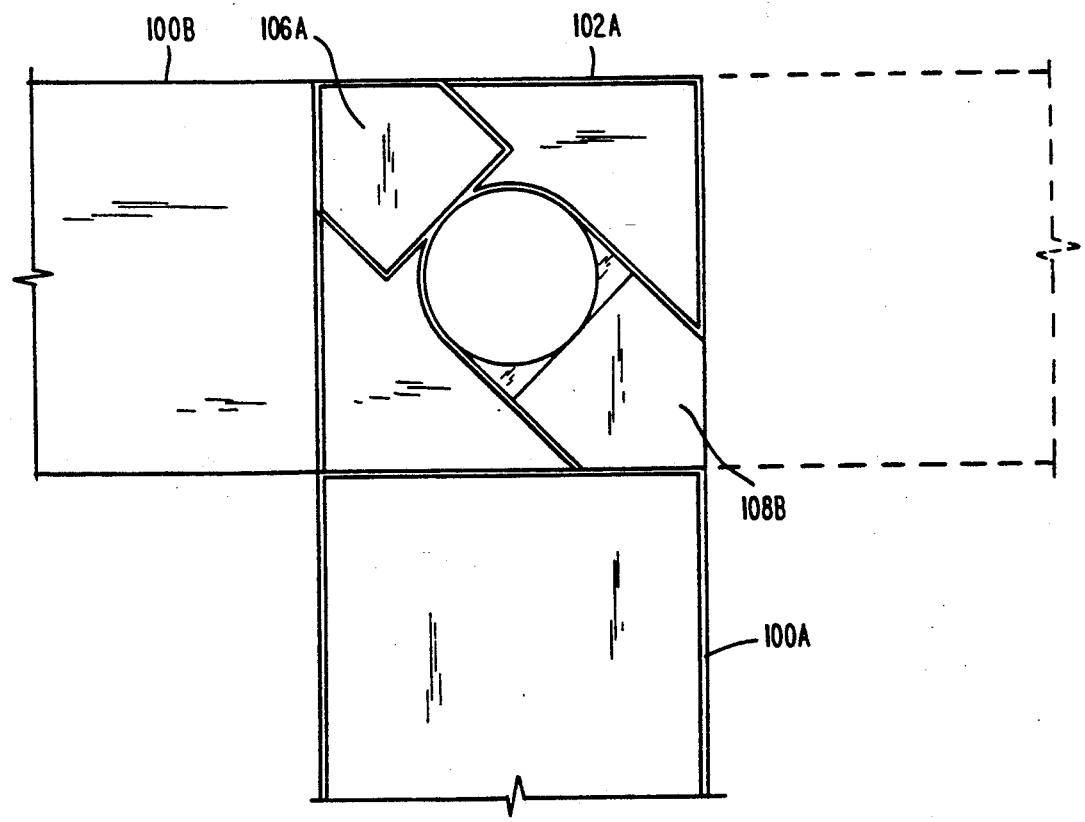
FIG. 11 shows a top view of right angled joint formed from two of the elements of FIG. 8.

FIG. 11 shows aright angle joint formed from a panel 100A and further panel 100B, which has been inverted so that peg 108 is now in the uppermost position. Again, the outline of panel 100A is indicated in double line for clarity.

In this configuration, peg 108B engages an aperture in panel 100A and peg 108A engages aperture in panel 100. Again, a flush exterior joint surface is formed.

If either panel 100 in FIG. 11 was modified such that joint member 102 was located at other than a distal end of the panel, as indicated in ghost lines in the figure, a T joint can also be constructed.

The above and previously described panels and beams may be formed from conventional building materials such as wood, concrete or steel but it is anticipated that they will be especially useful when fabricated from lightweight plastic by blow-moulding or extrusion. This will permit the simple and inexpensive construction of light weight structures with good rigidity and a pleasing visual appearance. When formed of plastic materials, the beams be hollow and single or double-walled members which may be filled with a suitable insulating material for improved thermal or acoustic properties.

Figure 12:
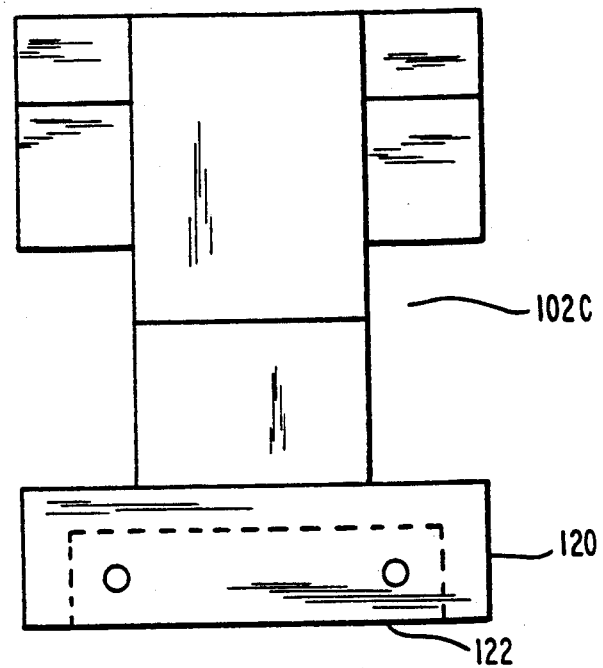
FIG. 12 shows a front view of another joint element.
Figure 13:
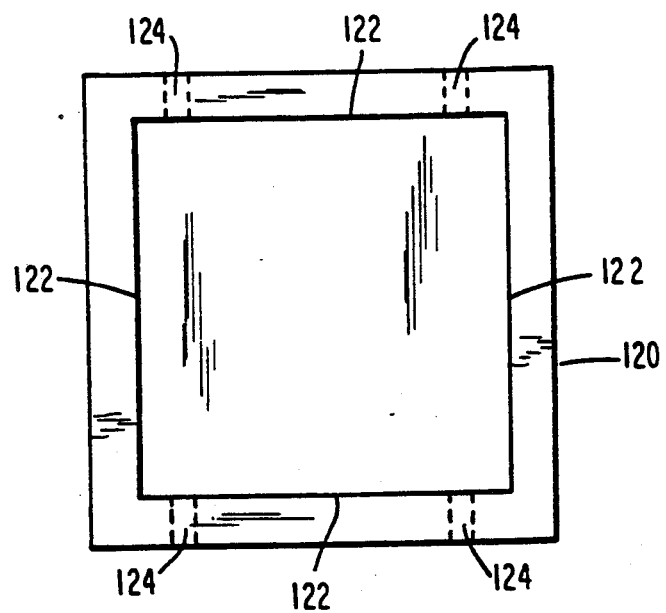
FIG. 13 shows a rear view of the joint element of FIG. 12.

It should also be understood by those of skill in the art that the joint members 102 can be constructed without an attached panel, instead having an appropriate connection means such as a cuff or channel which is adapted to receive a conventional pane member. FIG. 12 shows a joint member 102C, which is similar to joint member 102 in FIGS. 8 and 9, except in that a cuff 120 is provided for attaching the member 102 to a known beam. As shown in FIG. 13, the cuff includes walls 122 and apertures 124.

When used with a beam such as a piece of dimensional lumber, a screw or nail may be inserted through apertures 124 to maintain the joint member 102 in contact with the cuff 120.

Figure 14:
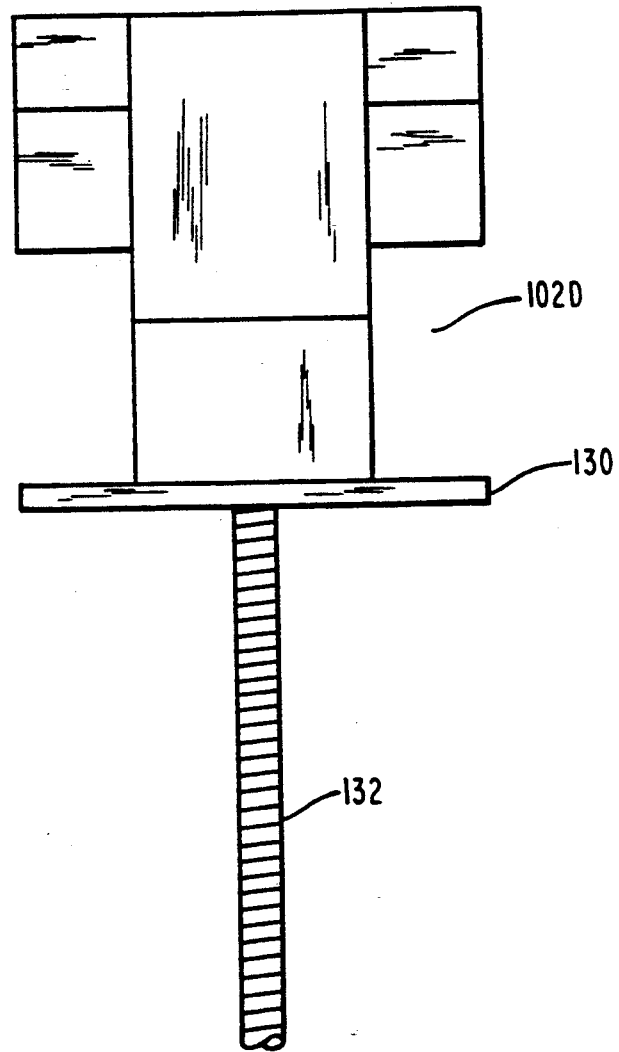
FIG. 14 shows a front view of another joint element.

FIG. 14 shows a similar joint member 102D which is suitable for use when casting concrete beams. A plate 130 is provided to abut the end of form for a poured concrete beam and one or more portions of a suitable concrete reinforcing rod 132 extend from the plate into the form. When the concrete is poured, joint member 102D will be rigidly attached. Other methods of attaching the joint member to beams or panels will be apparent to those of skill in the art.

As can be seen, the present invention provides a novel method of forming notch on notch joints which provides an improved visual appearance without sacrificing the strength of the joint. The present invention is particularly suitable for use with plastic beams, such as those extruded or blow moulded.

We claim:

1. A system for joining at least three members by joint elements comprising:
   first and second joint elements, each with opposed surfaces, at least one notch formed across a portion of the width of each said opposed surface, the notch on one opposed surface of said first element being complementary to a notch of said second element, said complementary notches inter-engaging to form a notch on notch joint between said first and second elements, the notch on the other opposed surface of said first element engaging a complementary notch on a third element to form a second notch on notch joint between said first and third elements;
   each of said inter-engaging elements further including a longitudinal extension beyond said notch, each said extension including an abutment surface, said abutment surface of said first inter-engaging element being complementary to and engaging said abutment surface of said second inter-engaging element.

2. A system according to claim 1, wherein the depth of said notch in at least the first element is not greater than one third the height of said element.

3. A system according to claim 1, wherein said extensions form a flush exterior surface for said joint.

4. A system according to claim 1, wherein said extensions form a smooth exterior surface of said joint.

5. A system according to claim 1, wherein said abutment surfaces inhibit rotation of said elements about said joint.

6. A system according to claim 1, wherein each said notch includes a detent and each said element includes a boss complementary to each said detent, said boss and detent being arranged such that said boss of one said inter-engaging elements is received in said detent of the other of said inter-engaging elements and said boss of said other inter-engaging element is received in said detent of said one of said inter-engaging elements, said bosses and detents operating to maintain said joint in said inter-engaged position.

7. A system according to claim 1, wherein a passage is provided through said joint.

8. A system according to claim 1, wherein said first and second elements are integrally formed on said members.

9. A system according to claim 1, wherein said first and second elements are adapted for connection to cast concrete members.

10. A system according to claim 1, wherein said first and second elements each have a second notch which is formed across a portion of said extension and said abutment surface is provided by a boss between said first and second notches and a second abutment surface is provided by an aperture through said extension, said abutment surface of each of said first and second elements engaging said second abutment surface of the other of said first and second element.

11. A system according to claim 10, wherein said first and second notches on said first element inter-engage with said first and second notches of said second element respectively when forming a right angled joint and with said second and first notches of said second element when forming an inline joint.

12. A system according to claim 10, wherein said first element is attached between distal ends of first and second members and said second element is attached to a third member, said first and second elements inter-engaging to form a T-shaped joint with said third member being the base, and said first and second members each being one side of the top of the T-shaped joint.

* * * * *